JAMES L. GROSH
*INVENTOR.*

BY
ATTORNEY

Nov. 30, 1971  J. L. GROSH  3,623,930

COMPOSITE REINFORCED PLASTIC PIPE

Filed Nov. 24, 1967  2 Sheets-Sheet 2

JAMES L. GROSH
INVENTOR.

BY *Steven F. Low*
ATTORNEY

United States Patent Office 3,623,930
Patented Nov. 30, 1971

3,623,930
COMPOSITE REINFORCED PLASTIC PIPE
James L. Grosh, Los Altos, Calif., assignor to United Aircraft Corporation, East Hartford, Conn.
Continuation-in-part of applications Ser. No. 641,962, and Ser. No. 641,963, now Patent No. 3,470,917, both May 29, 1967, which is a continuation-in-part of application Ser. No. 546,676, May 2, 1966, now Patent No. 3,483,986. This application Nov. 24, 1967, Ser. No. 685,402
Int. Cl. B32b 1/08
U.S. Cl. 156—250                6 Claims

ABSTRACT OF THE DISCLOSURE

A method for forming bell and spigot fittings on a reinforced plastic pipe in which the bell fitting is formed by building up a reinforced plastic wall structure on a mandrel configured to produce a generally tubular pipe portion and an outwardly expanded bell housing portion. The spigot fitting is then formed about the wall structure of the pipe by suitable location of the bell portion of the mandrel. By appropriate location and configuration of the spigot forming molds, it is possible to form more than one complete pipe segment on one mandrel. Further, certain advantages may be obtained if the same resin used to form the reinforced plastic wall structure is used to form the spigot fitting and in addition other advantages may be obtained if the wall structure and the spigot structure are cured simultaneously.

BACKGROUND OF THE INVENTION

This application is a continuation-in-part of my copending coassigned patent application, Ser. No. 641,963 now abandoned, for Transverse Filament Reinforcing Tape and Methods and Apparatus for the Production Thereof, filed May 29, 1967, and Ser. No. 641,962, now Pat. No. 3,470,917 for Composite Reinforced Plastic Pipe, filed May 29, 1967, which is in turn a continuation in part of my copending coassigned application, Ser. No. 546,676, now Pat. No. 3,483,896 for Composite Reinforced Plastic Pipe, filed May 2, 1966.

Reinforced plastic pipes are commonly formed by generating a cylinder from suitable filamentary material by continuously winding the filaments on a removable mandrel, the filaments being impregnated with a curable resinous material either before application to the mandrel or upon application to the mandrel, followed by curing of the structure and removal of the mandrel. By appropriate selection of the filamentary material and the binder, typically glass filaments and an epoxy or polyester resin, strong, corrosion resistant structures can be fabricated. In order to connect individual lengths of such pipe, it is necessary to provide some form of joint means at the ends of the individual pipe lengths. Bell and spigot fittings are quite commonly used for this purpose and are formed conventionally by winding the pipe wall about a mandrel configured to produce the internal bell configuration on the pipe with the spigot joint being machined into the pipe wall after the structure has been cured. The machining operation to form the spigot is both time consuming and wasteful of the relatively expensive reinforced plastic structure which is machined away. According to this invention, however, a pipe having bell and spigot fittings is formed by building up a wall structure of reinforced plastic about a suitably configured mandrel to form the internal configuration of the bell housing and the generally tubular body portion of the pipe. The spigot fitting is then formed about the wall structure of the pipe from a mass of curable plastic material applied about the wall structure. In some instances, it is desirable to form the spigot fitting from the same plastic from which the reinforced wall structure is formed and also to cure the materials simultaneously to produce a joint structure which has virtually no detectable interface between the spigot fitting and the wall structure about which it is formed. Further, in many instances it is economically feasible to manufacture a pipe in a length greater than that which is actually required in use. Thus, for example, it may be feasible to employ forty foot long mandrels in the manufacturing process whereas for reasons of storage, shipment, or installation a pipe in twenty or ten foot lengths is the desired end product. According to this invention, a method is provided whereby by appropriate selection of the configuration and location of the spigot fitting and the bell housing forming elements, it is possible to generate a structure which can be severed after curing to produce more than one pipe length having bell and spigot fittings at both ends.

It is accordingly an object of this invention to provide a method for producing reinforced plastic pipe having bell and spigot fittings at the ends thereof. It is another object of this invention to provide a method for forming more than one pipe length having bell and spigot fittings on a single mandrel.

These and other objects of this invention will be readily apparent from the following description with reference to the accompanying drawings wherein.

BACKGROUND OF THE INVENTION

Figure 1:
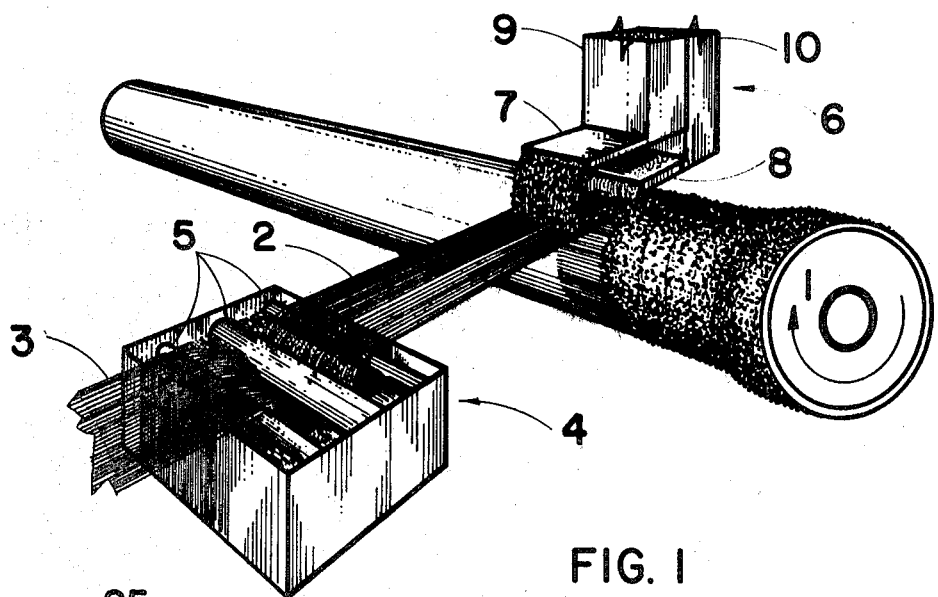
FIG. 1 is a schematic representation of the fabrication of pipe according to this invention.

Referring now to FIG. 1, a schematic representation of a system for fabricating pipe usable with this invention is shown. Since the apparatus forms no part of this invention, only the elements necessary for an understanding of this invention are shown, a complete description of a suitable machine appearing in U.S. Pat. No. 3,228,616.

A mandrel adapted for rotation as shown by the arrow has a band 2 of filaments 3 wet with resin by passage through resin pot 4 and across wiping rollers 5 continuously applied thereto. The filaments are continuously wrapped around the mandrel along the length thereof by causing relative reciprocal longitudinal motion between the mandrel and the band while the mandrel is rotating. The pitch or winding angle can be controlled, as is known in the art, by appropriate selection of the speed of rotation of the mandrel and the speed of longitudinal motion. The filament band 2 is preferably applied at a very high winding angle so that the continuous annularly disposed filaments are essentially hoop windings.

A hopper assembly 6 may be provided which is maintained over mandrel 1 at the location where band 2 contacts mandrel 1. Hopper asssembly 6 preferably comprises two separate discharge portions 7 and 8 each of which have separate feed portions 9 and 10. Discharge portion 7 is located in front of discharge portion 8, the spacing of which is exaggerated for clarity in FIG. 1 and preferably vertically above the point of contact of the filament band 2 and the mandrel, such that particles fed from discharge 7 will be applied to band 2 on the mandrel and as the mandrel rotates particles from discharge 8 will be applied over the particles from discharge 7. Sufficient resin is contained on band 2 to cause the particles applied to adhere thereto. Particles in supply portion 9 are of larger size than in supply portion 10 so that larger sized particles are applied first with the smaller sized particles being applied over the larger particles and in the spaces therebetween.

Longitudinal reinforcement may also be incorporated into the wall structure to provide resistance to longitudinal bending loads. The process of fabrication is continued for the number of passes sufficient to build up a wall structure of the desired thickness.

Figure 2:
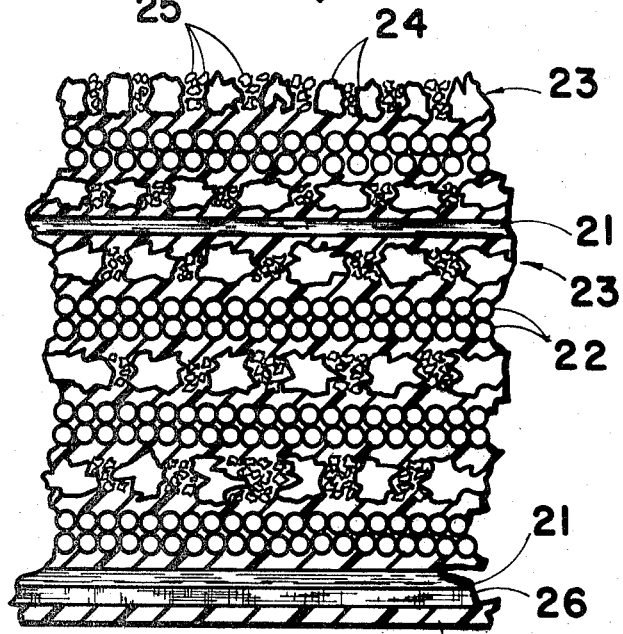
FIG. 2 is an enlarged sectional view through the wall of a pipe according to this invention.

Referring now to FIG. 2, a cross section through the wall of a pipe manufactured according to the above described process is shown. It should be noted that the thicknesses of the sand and filament layer are not drawn to scale and that the thicknesses are selected within the guidelines set out above. The inner layer 20 is a gel coat containing veil cloth 26 which was initially applied around the resin coated mandrel. Particles such as 100 mesh sand may be incorporated in gel coat 20 to improve erosion resistance of the finished pipe.

To provide longitudinal reinforcement, layers of longitudinally extending filaments 21 have been applied over the veil cloth and in proximity to the outer surface of the pipe to increase the resistance to bending.

Layers of annularly disposed high strength filaments 22 separated by particle layers 23 preferably composed of large particles 24 and smaller particles 25 form the wall structure intermediate layers 21 and layers of filaments and particles can also be applied over the outer layer of filaments 21 to maintain the orientation of layer 21. The whole structure is held together by the cured resinous matrix 28 the thickness of which is greatly exaggerated in FIG. 2 for clarity.

Example I

A 24" I.D. and 24¾" O.D. pipe was manufactured according to this invention employing fiberglass filaments and sand having 16 mesh, 200 mesh average size. The fiberglass layers were about .005" thick and the particle layers were about .05" thick. The finished pipe consisted of about 35% resin, 15% glass and 50% sand with about 10% by weight of sand being in the form of fine particles.

Figure 3:
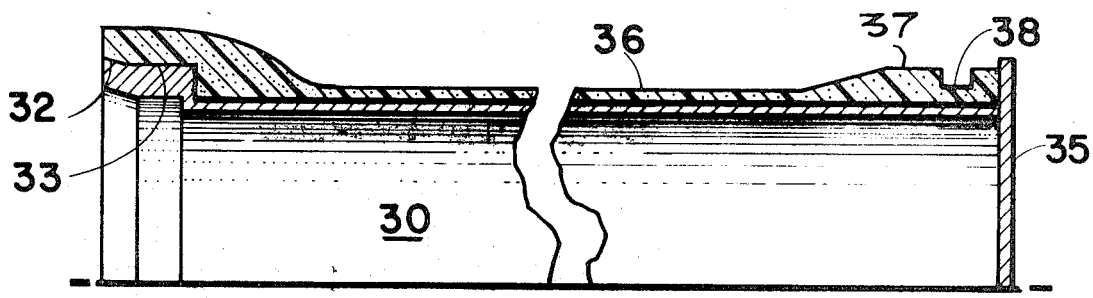
FIG. 3 is a cross section through a mandrel assembly illustrating the formation of the bell and spigot elements of the pipe.
Figure 4:
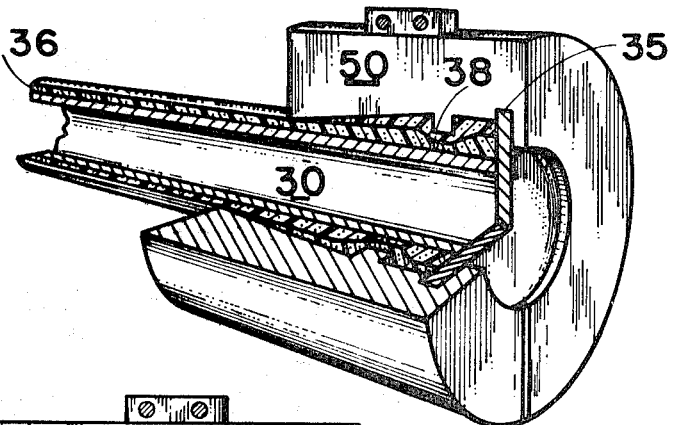
FIG. 4 is an enlarged sectional view showing the formation of the spigot element.

The formation of the bell and spigot fittings is illustrated in FIGS. 3 and 4. The mandrel 30 is provided at one end with an exterior surface contoured to form the interior of the bell housing comprising inlet portion 32, sealing surface 33 and abutment 34. The opposite end of mandrel 30 may be fitted with a removable plate forming a raised shoulder 35 to provide a smooth end on the composite reinforced plastic pipe 36 fabricated as above described. A similar plate may be used at the bell end if desired. The spigot portion 37 containing the O-ring slot 38 for sealing purposes comprises a plastic body which may be loaded with a filler such as chopped glass rovings or sand for example bonded onto the wall structure of pipe 36 which has preferably been thickened at this area by the winding of extra filament layers and particle layers. The spigot portion 37 containing the O-ring slot 38 is formed by any conventional molding technique. A suitable technique would employ a split ring mold 50, configured to form slot 38, which is filled with an uncured resin, preferably loaded as described above, and tightly clamped around pipe 36 which may also be preliminary coated with a layer of uncured resin at the situs of the mold. The resin used to form the spigot fitting is cured and after the cure the mold structure is removed to produce a strong unitary joint structure. If the resin used to form the spigot is the same resin as was used to form the wall structure and further if the wall structure and the spigot fitting structure are cured simultaneously, no detectable interface will be formed between the resin of the pipe and the resin of the spigot further reducing the likelihood of failure at this structure.

Figure 5:
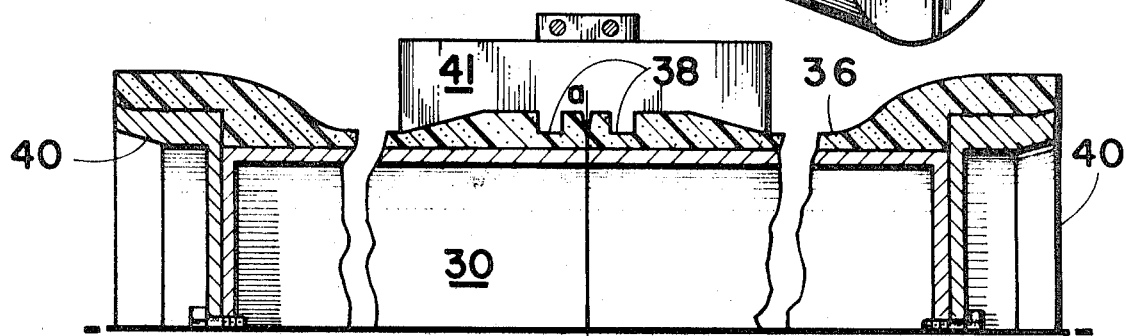
FIG. 5 is a sectional view of a mandrel and mold arrangement of this invention.
Figure 6:
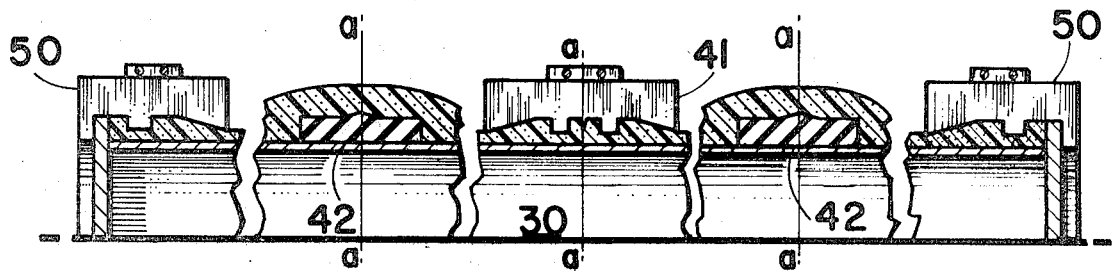
FIG. 6 is a sectional view of another mandrel and mold arrangement.

In some instances, it may be practicable to form several pipes on the same mandrel and this may be accomplished as shown in FIGS. 5 and 6.

In FIG. 5, the mandrel 30 has removable fittings 40 configured to form the interior of the bell mounted on both ends and a mold 41 forming two O-ring slots 38 is applied to the center of the pipe as described above. After cure the end portions 40 are removed from the mandrel and mold 41 is removed from the pipe. The pipe 35 is then removed from the mandrel and cut transversely along line a—a to provide two complete pipes.

In a similar manner, many pipes can be formed on one mandrel by using the system shown in FIG. 6. Using mandrel inserts 42 and mold 41, four pipes can be produced by cutting the structures removed from the mandrel along lines a—a.

While this invention has been described with respect to a specific embodiment thereof, it should not be construed as limited thereto. Various modifications will suggest themselves to workers skilled in the art and may be made without depicting from the scope of this invention which is limited only by the following claims wherein.

I claim:

1. A method for producing a reinforced plastic pipe provided with a spigot fitting at one end, said spigot fitting having an annular recess adapted to receive sealing means, said method comprising:
    (a) forming around a mandrel a unitary wall structure of uncured reinforced plastic,
    (b) applying onto and around said wall structure an uncured plastic means mass configured to form said spigot fitting, the curable components of said uncured plastic mass being the same as the curable components of said uncured reinforced plastic wall structure, and
    (c) curing said wall structure and said spigot fitting simultaneously.

2. A method for producing more than one length of reinforced plastic pipe, each pipe length having a bell housing at one end and a spigot fitting having an annular recess adapted to receive sealing means on the other end which method comprises:
    (a) forming a tubular reinforced plastic wall structure, said wall structure being configured to form two oppositely directed bell housings spaced apart by a cylindrical pipe portion,
    (b) forming a double spigot structure of uncured plastic around said wall structure at a point intermediate said bell fittings, said double spigot structure being configured to form, when severed transversely along a predetermined plane, two separate annular recesses, one associated with each pipe length,
    (c) curing said double spigot structure to said reinforced plastic wall structure, and
    (d) severing said spigot structure and said wall structure along said predetermined plane.

3. A method for producing more than one length of reinforced plastic pipe, each pipe length having a bell housing at one end and a spigot fitting having an annular recess adapted to receive sealing means on the other end which method comprises:
    (a) forming a tubular reinforced plastic wall structure, said wall structure being configured to produce two adjacent, oppositely directed bell housings having cylindrical pipe portions extending in opposite directions from each bell housing portion,
    (b) forming spigot structures of uncured plastic around said wall structure on each side of said oppositely directed bell housings,
    (c) curing each said spigot structure to said wall structure, and
    (d) severing said wall structure transversely between said oppositely directed bell housings.

4. The process of claim 1 wherein the spigot structure is formed from a plastic loaded with a filler.

5. The method of claim 2 wherein said plastic spigot structure is formed from the same resin system as said wall structure and said wall structure and said spigot structure are cured simultaneously.

6. The method of claim 3 wherein said plastic spigot structure is formed from the same resin system as said wall structure and said wall structure and said spigot structure are cured simultaneously.

References Cited

UNITED STATES PATENTS

| | | | |
|---|---|---|---|
| 2,372,877 | 4/1945 | Binns et al. | 156—173 |
| 2,941,915 | 6/1960 | Manning | 156—173 |
| 3,336,176 | 8/1967 | Medney | 156—173 |
| 3,368,936 | 2/1968 | Long | 156—173 |
| 3,379,591 | 4/1968 | Bradley | 156—173 |
| 3,410,741 | 11/1968 | Barnet | 156—173 |
| 3,449,188 | 6/1969 | Huff | 156—173 |
| 3,372,073 | 3/1968 | Cutler | 156—245 |
| 3,291,670 | 12/1966 | Usab | 156—245 |
| 3,219,516 | 11/1965 | Cobbledick | 156—245 |
| 2,889,582 | 6/1959 | Cooper | 156—245 |
| 3,489,626 | 1/1970 | Rubenstein | 156—173 |
| 1,721,253 | 7/1929 | Loughead et al. | 156—189 |

CARL D. QUARFORTH, Primary Examiner

B. H. HUNT, Assistant Examiner

U.S. Cl. X.R.

156—173, 174, 175, 189, 191, 193, 195, 245